United States Patent
Wooley et al.

(10) Patent No.: US 7,517,084 B2
(45) Date of Patent: Apr. 14, 2009

(54) MULTIFOCAL CONTACT LENS DESIGNS UTILIZING PUPIL APODIZATION

(75) Inventors: C. Benjamin Wooley, Jacksonville, FL (US); Amitava Gupta, Roanoke, VA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 229 days.

(21) Appl. No.: 11/429,714

(22) Filed: May 8, 2006

(65) Prior Publication Data

US 2007/0258042 A1 Nov. 8, 2007

(51) Int. Cl.
*G02C 7/02* (2006.01)
*G02C 7/04* (2006.01)

(52) U.S. Cl. ................................ 351/177; 351/161
(58) Field of Classification Search ............. 351/160 R, 351/160 H, 161, 162
See application file for complete search history.

(56) References Cited

U.S. PATENT DOCUMENTS

| | | | |
|---|---|---|---|
| 4,580,882 A | 4/1986 | Nuchman et al. | |
| 4,636,049 A | 1/1987 | Blaker | |
| 4,666,640 A * | 5/1987 | Neefe | 264/2.1 |
| 5,002,382 A | 3/1991 | Seidner | |
| 5,448,312 A | 9/1995 | Roffman et al. | |
| 5,574,518 A | 11/1996 | Mercure | |
| 5,682,223 A | 10/1997 | Menezes et al. | |
| 5,835,192 A | 11/1998 | Roffman et al. | |
| 5,929,969 A | 7/1999 | Roffman | |
| 6,089,711 A * | 7/2000 | Blankenbecler et al. | 351/160 R |
| RE38,193 E | 7/2003 | Bowling | |
| 6,827,444 B2 * | 12/2004 | Williams et al. | 351/212 |
| 6,929,366 B2 | 8/2005 | Perel et al. | |
| 7,293,873 B2 * | 11/2007 | Dai et al. | 351/205 |
| 2002/0044255 A1 | 4/2002 | Ye | |
| 2003/0053025 A1 | 3/2003 | Turner | |
| 2004/0085515 A1 | 5/2004 | Roffman et al. | |
| 2004/0246440 A1 * | 12/2004 | Andino et al. | 351/177 |
| 2005/0254006 A1 * | 11/2005 | Dai et al. | 351/177 |
| 2007/0159601 A1 * | 7/2007 | Ho et al. | 351/221 |
| 2008/0033546 A1 * | 2/2008 | Liang | 623/5.11 |

FOREIGN PATENT DOCUMENTS

EP 0601846 A1 6/1994

OTHER PUBLICATIONS

Applegate, Raymond A. and Vasudevan Lakshminarayanan, *Parametric Representation of Stiles-Crawford Functions: Normal Variation of Peak Location and Directionality*, Opt. Soc. Am. A, vol. 10, No. 7, pp. 1611-1623 (Jul. 1993).
Martin, Joy A. and Austin Roorda, PHD, *Predicting and Assessing Visual Performance With Multizone Bifocal Contact Lenses*, Optometry and Vision Science, vol. 80, No. 12, pp. 812-819 (Dec. 2003).
Applegate, Raymond A., Powerpoint presentation at the 4th International Congress on Wavefront Sensing and Aberration Free Refractive Correction, San Francisco, Feb. 14-16, 2003.
Alpern, M; Mason, GL; Jardinico, RE, "Vergence and Accommodation; V; Pupil Size Changes Associated With Changes in Accommodative Vergence", Amer. J. Opthal., vol. 52, pp. 762-767 (1961).
Johnson, CA; Casson, EJ, "Effects of Luminance, Contrast, and Blur on Visual Acuity". Opt. & Vis. Sci., vol. 72, pp. 864-869 (1995).

* cited by examiner

*Primary Examiner*—Jordan M. Schwartz

(57) ABSTRACT

The invention provides a contact lens that corrects for the wearer's refractive prescription by taking into account both pupil size and the Stiles Crawford effect of the first order.

14 Claims, 2 Drawing Sheets

MULTIFOCAL CONTACT LENS DESIGNS UTILIZING PUPIL APODIZATION

FIELD OF THE INVENTION

The invention relates to multifocal ophthalmic lenses. In particular, the invention provides contact lenses that provide correction for presbyopia using multifocal designs that are scaled to an individual, or group of individuals, based on both pupil size and the Stiles-Crawford effect.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is absent.

Among the methods used to correct for the eye's failure to accommodate are lenses that have more than one optical power. In particular, multifocal contact and intraocular lenses have been developed in which zones of distance and near, and in some cases intermediate, power are provided.

It is known that an individual's pupil size varies with age, luminance and distance from the eye to the object being viewed. For example, as luminance increases, pupil size decreases while, as a person ages, the pupil's response to changes in illumination diminishes. However, some conventional multifocal contact lenses typically do not account for pupil size and, thus, are less efficient in distributing light to the lens wearer in all viewing conditions. Even in those lenses that account for pupil size, the lenses do not account for the fact that the cones of the eye are more sensitive to light rays that strike perpendicular to the cones' surface than other rays. Thus, the intensity of the response to light peaks at or near the center of the pupillary aperture and decreases towards the edges, a phenomenon known as the Stiles-Crawford effect of the first kind ("Stiles Crawford Effect" or "SCE"). Therefore, the best visual result for a lens cannot be obtained by merely matching the size of the optical zones of a multifocal lens by taking into account only pupil size. Rather, the design must take into account both the pupil size and the Stiles-Crawford Effect.

DETAILED DESCRIPTION OF THE INVENTION AND PREFERRED EMBODIMENTS

The invention provides a contact lens, and methods for producing the lens, which lens corrects for the wearer's refractive prescription by taking into account pupil size along with the SCE. The method of the invention is useful in designing both multifocal contact and intraocular lenses, but may find its greatest utility in providing multifocal contact lens designs.

In one embodiment, the invention provides a method for designing a contact lens, comprising, consisting essentially of, and consisting of the steps of: a.) providing an optical design; and b.) scaling the optical design based on pupil size and SCE.

In the first step of the invention, a multifocal optical design is provided. The design may be any desired multifocal design, but preferably the design contains at least two, radially symmetric zones: a first zone that is a central zone and a second zone that is an annular zone that surrounds the central zone. Preferably, the central zone is a distance vision zone, meaning a zone that provides the power required to substantially correct the lens wearer's distance vision acuity to the degree desired. The annular zone preferably is a near vision zone, meaning a zone that provides the power required to substantially correct the lens wearer's near vision acuity to the degree desired. Alternatively, the near vision zone may be biased up to about 0.5 diopters to provide intermediate vision correction.

Figure 1:
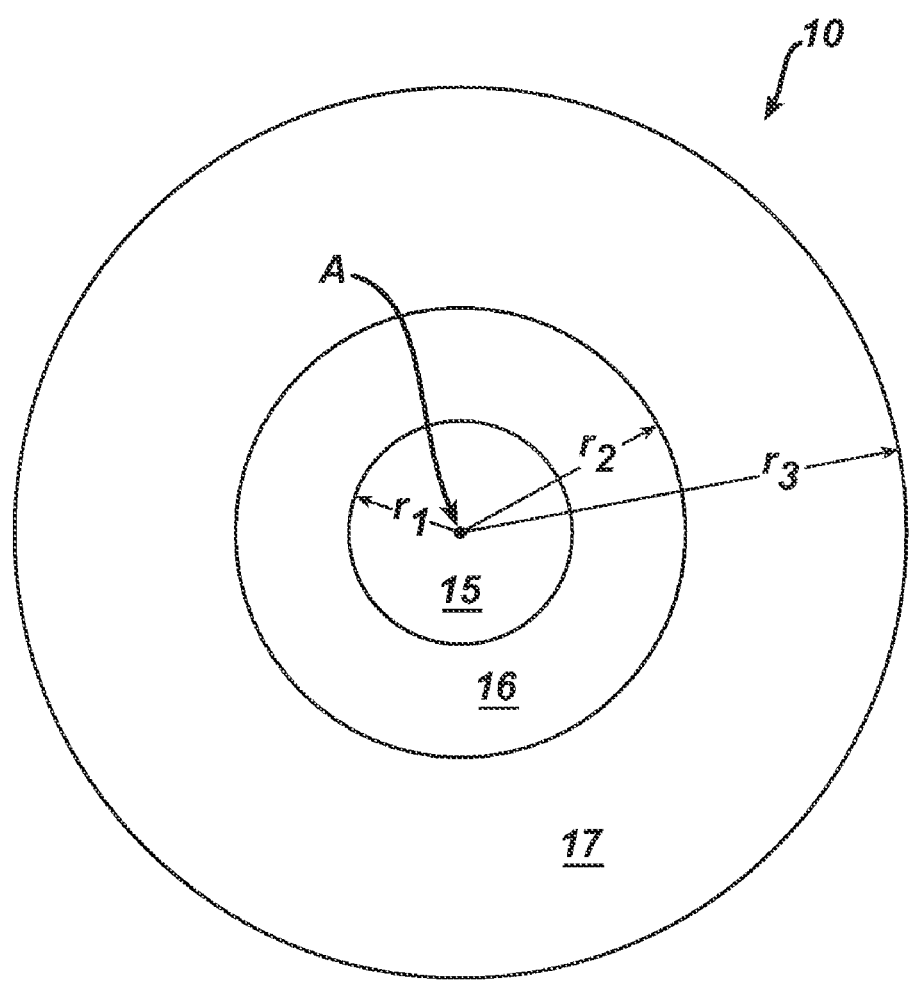
FIG. 1 depicts a multifocal lens design.

More preferably, the design includes a second annular zone that provides distance vision correction. Any number of additional zones may be included in the design, which zones may provide one or more of distance or near vision correction or intermediate power, meaning corrective power between that of the near and distance power. For illustrative purposes, a multifocal design 10 is depicted in FIG. 1. The design is composed of a central distance vision zone 15, a first annular zone of near vision power 16 and a second annular zone of distance vision power. The radii of the central zone ("$r_1$"), the first annular zone ("$r_2$"), and the second annular zone ("$r_3$") is 1, 2, and 4 mm, respectively, measured from point A, the geometric center point of the lens surface.

In the method of the invention, the design is scaled based on pupil size and a consideration of the SCE. In scaling based on pupil size, either pupil size measurements of a population of individuals or a pupil size of one individual may be used. For example, Table 1 lists pupil size data based on thirteen individuals between 35 to 42 years of age.

TABLE 1

| Luminance Level ($cd/m^2$) | 1 Individual (mm) | Extrapolation for 1 Individual (mm) | Range (13 individuals, 35-42 years old) (mm) | Best Fit, All Data (mm) |
|---|---|---|---|---|
| 0.31 | 7.4 | 7.3 | 7.4-4.9 | 5.8 |
| 1 | 5.8 | 5.9 | 5.8-4.1 | 4.8 |
| 3.1 | 4.8 | 4.9 | 4.8-2.7 | 4.16 |
| 10 | 4.0 | 4 | 4.0-2.5 | 3.51 |
| 31 | 3.4 | 3.3 | 3.4-2.4 | 2.98 |
| 100 | 2.8 | 2.7 | 2.8-2.2 | 2.51 |
| 311 | | 2.24 | | 2.143 |
| 1000 | | 1.84 | | 1.80 |

The data may be used to calculate a best fit using the following equation:

$$y = 4.8997 x^{-0.1448} \tag{I}$$

wherein x is the luminance level in candela per millimeter; and y is the pupil diameter in millimeters. The results of such calculation are listed in the "Best Fit, All Data" column of Table 1.

Alternatively, the following power law fit equation may be used for clacluating based on pupil size data of an individual:

$$y = 5.9297 x^{-0.1692} \tag{II}$$

wherein x is the luminance level in candela per millimeter; and y is the pupil diameter in millimeters. The results of such calculation are listed in the "Extrapolation for 1 Individual" column of Table 1.

As an example, the three zone, multifocal design of FIG. 1 is scaled based on an indvidual's pupil size. Table 2 below lists typical light levels measured in a lighting environments.

TABLE 2

| | Luminance (cd/m$^2$) |
|---|---|
| Bright sun | 3,000-6,000 |
| Hazy day | 1,500-3,000 |
| Cloudy bright | 600-1,500 |
| Cloudy dull | 120-600 |
| Very dull | 6-120 |
| Sunset | 0.06-6 |
| Full moon | 0.0006-0.006 |
| Starlight | 0.000006-0.00006 |
| Operating theater | 300-600 |
| Shop windows | 0-300 |
| Drawing office | 18-30 |
| Office | 12-18 |
| Living rooms | 3-12 |
| Corridors | 3-6 |
| Good street light | 1.2 |
| Poor street light | 0.06 |

Based on the data in Table 2, a representative luminance level for outdoor, daytime viewing of far objects is about 1000 cd/m$^2$, for viewing near and intermediate objects indoors is about 15 cd/m$^2$, and for viewing far objects outdoors in the evening is about 0.30 cd/m$^2$. When the data in Table 3 is extrapolated according to Equation II, the pupil size diameter of the individual is 2.0 mm at 1000 cd/m$^2$, 4.0 mm at 10 cd/m$^2$, and 7.2 mm at 0.30 cd/m$^2$.

Figure 2:
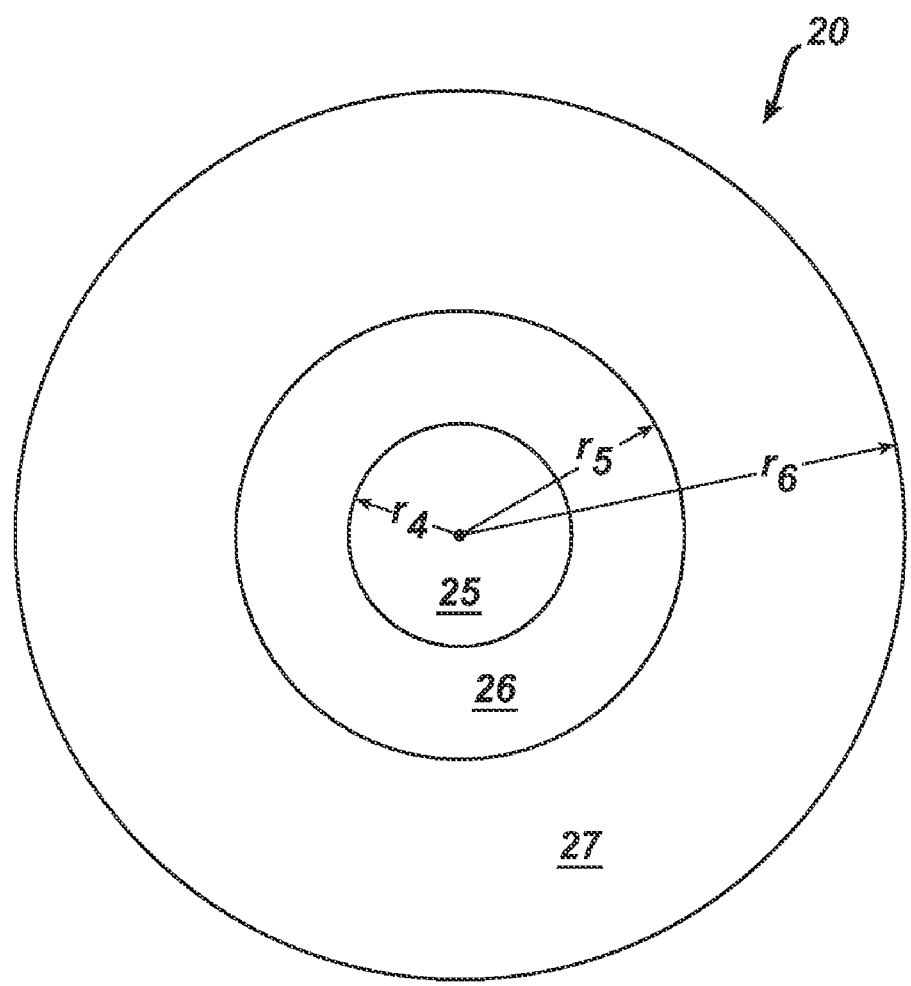
FIG. 2 depicts the design of FIG. 1 scaled to account for pupil size.

The foregoing extrapolation is used to scale the design of FIG. 1. The resultant scaled design 20 is shown in FIG. 2 with the radius of the central zone ("r$_4$"), the first annular zone ("r$_5$"), and the second annular zone ("r$_6$") being 1, 2, and 3.65 mm, respectively. Thus, the outer diameter of central distance vision zone 25 is 2 mm, the inner diameter and outer diameter of annular near vision zone 26 is 2 mm and 4 mm, respectively, and the inner and outer diameters of outer distance vision zone 27 is 4 mm and 7.3 mm, respectively. The ratio of the areas of the central, near and outer distance vision zone is 1:3.0:8.96.

In the method of the invention, the SCE is used to scale the design. Due to the SCE, the efficiency of the conversion of light into a visual photo-potential decreases away from the center of the pupil, or the point of peak efficiency. This drop off of efficiency may be represented by a parabolic function given by the Equation:

$$\text{Log } \eta = -\rho x^2 + 2\rho x x_{max} + \log \eta_{max} - \rho x_{max}^2 \quad (III)$$

wherein η is the efficiency of visualization of effectiveness; x is the distance of any point on the pupil from the point of peak efficiency; and ρ is a constant that is about 0.05 in healthy subjects.

Equation III is useful for determining the decrease in efficiency up to pupillary diameters of 6 mm. Beyond 6 mm, a Gaussian fit is used.

To determine the effective pupillary diameter that corrects for the SCE, Equation III is rewritten as:

$$\rho = 10^{-0.05 \cdot x^2 + \log(\rho_{max})} \quad (IV)$$

putting ρ as y, and x$_{max}$ as 0.

Equation IV is then integrated to obtain the area under the curve to the pupillary edge, as for example x=3 for a 6 mm pupil, and equated to a rectangle of the same area. For a measured papillary radius of X$_0$, the effective radius is:

$$\text{effective\_radius} = \frac{1}{2} \cdot \pi^{\frac{1}{2}} \cdot \frac{1}{(\ln(2) + \ln(5))^{\frac{1}{2}} \cdot \rho^{\frac{1}{2}}} \cdot \text{erf}\left[(\ln(2) + \ln(5))^{\frac{1}{2}} \cdot \rho^{\frac{1}{2}} \cdot x_0\right] \quad (V)$$

Effective pupillary diameters computed for certain representative measured values of pupillary diameters are listed on Table 3 below.

TABLE 3

| Actual Pupil Diameter (mm) | Effective Pupil Diameter (mm) |
|---|---|
| 2.0 | 1.93 |
| 4.0 | 3.46 |
| 6.0 | 4.44 |
| 8.0 | 4.94 |

Table 3 shows that, for large pupil sizes, the effective pupil size is smaller than the actual pupil size.

In the design shown in FIG. 1, the area ratio for FIG. 1 is 1:3.0:8.96 with pupil radii of 1, 2, and 3.65 mm. Considering just pupil area, which correlates with how much light energy is focused onto the retina from each zone, it can be concluded that the outer zone is too large and will negatively bias performance of the design.

In more detail, the area of the center ring is pi*$r_1^2$, the area of the first annular ring is pi*($r_2^2 - r_1^2$), and that of the outer ring is pi*($r_3^2 - r_2^2$). The ratio of the areas of the central to the near to the outer zone may be calculated as follows:

$$1 : \text{pi}*(r_2^2 - r_1^2)/\text{pi}*r_1^2 : \text{pi}*(r_3^2 - r_2^2)/\text{pi}*r_1^2$$

This may be simplified to:

$$1 : (r_2^2 - r_1^2)/r_1^2 : (r_3^2 - r_2^2)/r_1^2$$

wherein each of $r_1$, $r_2$ and $r_3$ are the effective radii calculated using Equation V. Calculating an effective pupil diameter using Equation V and then comparing the areas of each ring gives a ratio of 1:2.23:2.94 demonstrating that there is a significant decrease in the effectiveness of the outer distance vision zone.

Further, taking into account studies indicating that there is little loss of visual acuity as the level of luminance falls from 75 cd/m$^2$ to 7.5 cd/m$^2$, but that there is a pronounced loss of acuity as the luminance decreases from 7.5 cd/m$^2$ to 0.75 cd/m$^2$ to 0.075 cd/m$^2$, the impact of defocus induced image blur is more deleterious to visual acuity in low luminance conditions. Therefore, once the individual's near vision acuity needs are met, there is a need to provide as large an area of distance vision correcting optic as the individual's pupil will allow. Thus, a better distribution for this design will be obtained by decreasing the outer diameter of the near vision zone from 4 mm to 3.6 mm and increasing the outer diameter of the zone to 8.0 mm providing a distribution of area ratio that is 1:1.76:3.8

The foregoing illustrates scaling the design based on the pupil size of an individual. As an alternative, the design may be scaled based on the averages of pupil size information for a population of individuals as, for example, the full group represented by the data shown in the last two columns of Table 1. As yet another alternative, subgroups of a population may be defined, each of which subgroups contains individuals with similar pupil diameters as a function of luminance level.

In the designs of the invention, the best results will be obtained in cases in which the pupil size of the lens wearer dilates to a size that can use most or all of the multifocal zone. In the three-zone design, as the contribution of the outer distance vision zone diminishes due to insufficient pupil dilation, the amount of light entering the pupil decreases and there will be a drop in visual acuity. Thus, the three zone design may not be the optimal for individuals whose pupil does not dilate to 6.0 mm. In those cases, a two zone bifocal design, with a central near vision zone and an annular distance vision zone may be preferable. In this two zone design, if the central one diameter is 2.0 mm, a satisfactory image intensity for near objects will be obtained and the outer distance zone will provide satisfactory correction for those instances in which the pupil dilates in low luminance environments.

In the lenses of the invention, the central zone and additional zones may be on the front surface, or object side surface, the back surface, or eye side surface of the lens, or split between the front and back surfaces. Cylinder power may be provided on the back, or concave surface of the lens in order to correct the wearer's astigmatism. Alternatively, the cylinder power may be combined with either or both of the distance and near vision powers on the front surface or back surface. In all of the lenses of the invention, the distance, intermediate and near optical powers may be spherical or aspheric powers.

Contact lenses useful in the invention preferably are soft contact lenses. Soft contact lenses, made of any material suitable for producing such lenses, preferably are used. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred lens-forming material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Ser. No. 60/363,630 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens forming material may be carried out by any means known including, without limitation, thermal, irradiation, chemical, electromagnetic radiation curing and the like and combinations thereof. Preferably, the lens is molded which is carried out using ultraviolet light or using the full spectrum of visible light. More specifically, the precise conditions suitable for curing the lens material will depend on the material selected and the lens to be formed. Polymerization processes for ophthalmic lenses including, without limitation, contact lenses are well known. Suitable processes are disclosed in U.S. Pat. No. 5,540,410 incorporated herein in its entirety by reference.

The contact lenses of the invention may be formed by any conventional method. For example, the optic zone may be produced by diamond-turning or diamond-turned into the molds that are used to form the lens of the invention. Subsequently, a suitable liquid resin is placed between the molds followed by compression and curing of the resin to form the lenses of the invention. Alternatively, the zone may be diamond-turned into lens buttons.

What is claimed is:

1. A method for designing a contact lens, comprising the steps of: a.) providing an optical design with a plurality of optical zones; and b.) scaling the optical design by determining the effective pupillary diameter and adjusting the radii of each optical zone consistent with the Stiles Crawford Effect and near distance needs and providing as large an area of distance vision correcting optic as the effective pupillary diameter will allow consistent with meeting said near distance needs.

2. The method of claim 1, wherein the optical design is a multifocal design.

3. The method of claim 1, wherein the pupil size is pupil size measurements of an entire population of individuals or a portion of the population.

4. The method of claim 1, wherein the pupil size is of one individual.

5. The method of claim 2, wherein the pupil size is pupil size measurements of an entire population of individuals or a portion of the population.

6. The method of claim 2, wherein the pupil size is of one individual.

7. The method of claim 2, wherein the multifocal design comprises a first zone that is a central zone and a second zone that is an annular zone that surrounds the central zone.

8. The method of claim 7, wherein the central zone is a distance vision zone, and the annular zone is a near vision zone.

9. The method of claim 8, wherein the multifocal design further comprises a second annular zone that provides distance vision correction.

10. A lens designed according to the method of claim 1.
11. A lens designed according to the method of claim 2.
12. A lens designed according to the method of claim 7.
13. A lens designed according to the method of claim 8.
14. A lens designed according to the method of claim 9.

* * * * *